United States Patent [19]

Wormser

[11] Patent Number: 4,529,225
[45] Date of Patent: Jul. 16, 1985

[54] HIGH TRACTION VEHICLE
[75] Inventor: Robert S. Wormser, Ocala, Fla.
[73] Assignee: Federal Motors, Inc., Ocala, Fla.
[21] Appl. No.: 462,802
[22] Filed: Feb. 2, 1983
[51] Int. Cl.³ .............................................. B60B 29/00
[52] U.S. Cl. ..................................... 280/781; 180/904; 280/759
[58] Field of Search ............... 280/781, 784, 759, 755; 296/187, 193, 194, 195, 203, 205; 180/311, 20

[56] References Cited

U.S. PATENT DOCUMENTS

| | | | |
|---|---|---|---|
| 1,290,939 | 1/1919 | Dyke | 280/781 |
| 1,318,694 | 10/1919 | Roesch | 280/781 |
| 2,002,823 | 5/1935 | Marvel et al. | 280/781 |
| 2,111,563 | 3/1938 | Kliesrath | 280/781 |
| 2,448,172 | 8/1948 | Couse | 280/781 |
| 2,877,911 | 3/1959 | Arnot | 180/904 |
| 2,969,991 | 1/1961 | Ulinski | 280/759 |
| 3,002,782 | 10/1961 | Jahn | 280/781 |
| 4,057,158 | 11/1977 | Lissy | 180/904 |
| 4,428,599 | 1/1984 | Jahnle | 280/784 |

Primary Examiner—Richard A. Bertsch
Attorney, Agent, or Firm—Beaman & Beaman

[57] ABSTRACT

A heavy duty vehicle characterized by its high traction wherein the vehicle includes a frame consisting of a heavy metal plate of a length substantially equal to the vehicle length. The frame includes laterally extending portions substantially equal to the vehicle width, and the frame may be used to define vehicle fender supports and front and rear bumpers. The frame comprises a significant portion of the vehicle net weight, and in many instances may constitute substantially one half of the vehicle weight.

8 Claims, 5 Drawing Figures

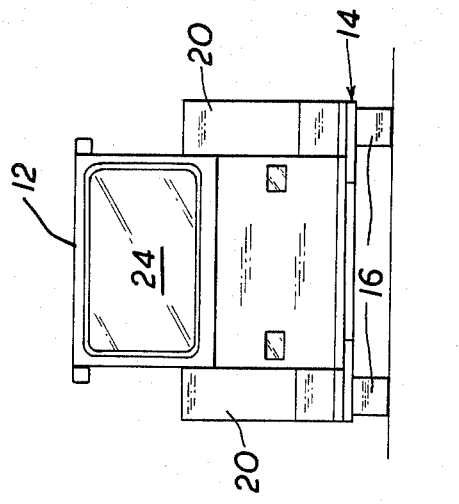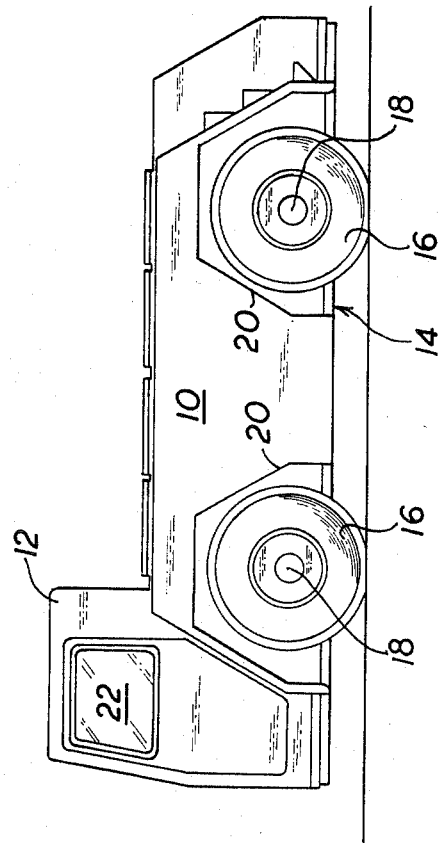

HIGH TRACTION VEHICLE

BACKGROUND OF THE INVENTION

Vehicles requiring high traction such as tractors, lift trucks, and similar heavy duty industrial equipment often utilize weights and counterweights mounted upon the vehicle to increase its net weight and improve weight distribution and thereby improve traction. The addition of separate weights or counterweights to conventional vehicle components requires providing space for such weights and means for attaching the weights to the vehicle body or frame. The necessity to provide space for the weights, and to locate the same upon the vehicle, complicates vehicle design and construction, and often detracts from the appearance and aesthetic features of the vehicle.

It is an object of the invention to provide a high traction heavy duty vehicle wherein the need for separate weights and counterweights is eliminated, and wherein vehicle weight may be relatively evenly distributed on the vehicle.

Another object of the invention is to provide a high traction vehicle utilizing a frame wherein the frame is formed of heavy metal plate, and the frame itself provides the extra weight necessary in a high traction vehicle usually achieved with auxiliary weights and counterweights.

A further object of the invention is to provide a high traction vehicle utilizing a heavy duty heavy metal plate frame wherein the frame is of a length substantially equal to the vehicle length and includes lateral portions of a width substantially equal to the vehicle width, the frame including edges which may serve as the vehicle bumpers, and the frame lateral portions may serve as running boards and fender supports.

An additional object of the invention is to provide a high traction vehicle utilizing a heavy metal plate frame wherein the extra weight added to the vehicle by the frame does not detract from the vehicle appearance nor complicate the vehicle's design and construction, and the frame constitutes a substantial portion of the net vehicle weight, preferably, approximately 50% of the vehicle net weight.

In the practice of the invention a high traction vehicle includes the usual vehicle components such as a body, frame, and motor driven wheels and axles mounted upon the frame. However, in the invention, the frame constitutes a substantial portion of the vehicle weight, and the frame is formed of a heavy metal plate from one to six inches or more in thickness. Preferably, the frame is of a length substantially equal to that of the vehicle, and the frame includes lateral portions defining a frame width substantially equal to the vehicle width. The lateral portions may be homogeneously defined upon a frame plate, or may constitute separate metal plates affixed to a main frame plate defining the vehicle length.

Preferably, the frame includes front and rear edges which may define front and rear bumpers, respectively, for the vehicle, and the lateral portions constitute a support for the vehicle body, such as for supporting fenders. Also, the frame lateral portion adjacent the front region may be used to define a running board aiding access to the vehicle cab. Wheel axle support cradles are defined upon the frame upper surface, and the frame configuration is such as to be readily incorporated into the vehicle configuration without detracting from the appearance thereof, and in fact, contributes to the vehicle appearance emphasizing the sturdy and heavy duty aspect of the vehicle.

BRIEF DESCRIPTION OF THE DRAWINGS

The aforementioned objects and advantages of the invention will be appreciated from the description and accompanying drawings wherein:

FIG. 1 is a side elevational view of a high traction vehicle in accord with the invention, FIG. 2 is a front elevational view of the vehicle.

DESCRIPTION OF THE PREFERRED EMBODIMENT

Figure 3:
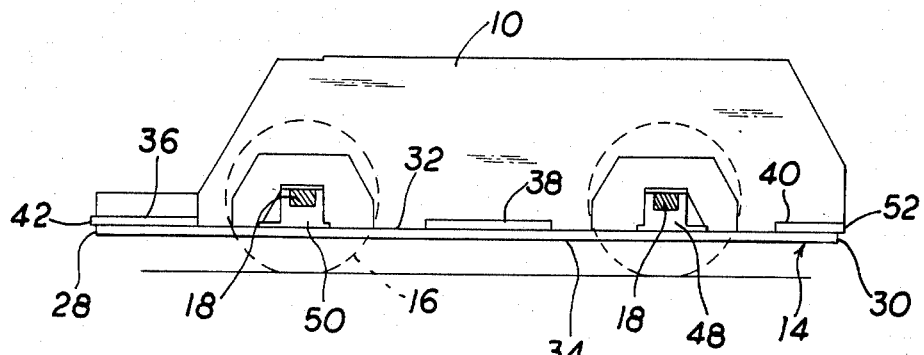
FIG. 3 is a side elevational view of a vehicle in accord with the invention, shown partially in section, and with portions of the vehicle omitted for purpose of illustration.

With reference to FIGS. 1 and 2, a high traction vehicle in accord with the invention is illustrated. The illustrated vehicle is of the aircraft tow tractor type commonly used at airports to tow aicraft to and from terminals and deplaning locations, and such tractors must be capable of readily towing heavy aircraft, yet must be of a concise configuration of restricted height.

The disclosed vehicle includes an elongated body 10, the front portion thereof including an operator cab 12. The vehicle also includes a frame 14 upon which the body is mounted and the vehicle includes wheels 16 having axles 18. Usually, all of the wheels are driven by the vehicle motor, not shown, drivingly connected to the wheels through conventional transmissions, and at least two of the wheels, and possibly all four, are steerable. The vehicle body includes wheel fenders 20, and the cab includes side window 22 and windshield 24, and lights and other common vehicle accessories are mounted upon the vehicle, and towing hitches, not shown, are usually mounted upon the vehicle at both the front and rear.

The basic component of the vehicle is the chassis or frame 14, and the novel aspect of the instant invention pertains to the frame. As the traction of a vehicle is directly proportional to the vehicle weight, with a towing tractor or other heavy duty vehicle of this type it is of advantage to have a high vehicle weight, and in accord with the invention, a substantial portion of the vehicle weight occurs in the frame itself.

In FIGS. 1-4 the illustrated frame 14 consists of an elongated main or primary metal plate 26 having a front end 28 and a rear end 30, and the plate includes an upper flat surface 32 and a lower flat surface 34. The vertical thickness of the plate 26 may vary from 1" to 6" or more, and in a vehicle having a net weight of approximately 40,000 pounds, the weight of the total frame would normally be approximately 20,000 pounds.

Figure 4:
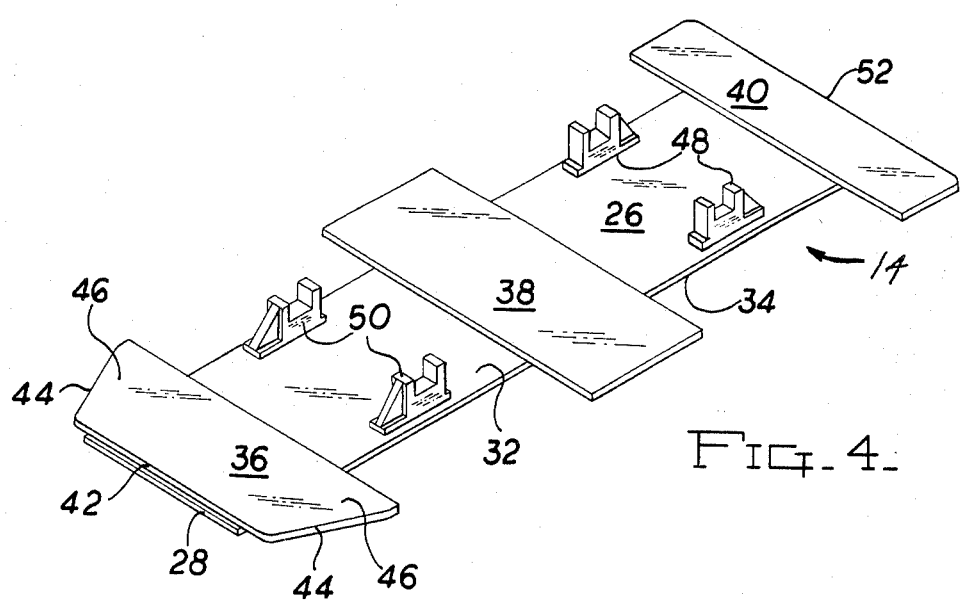
FIG. 4 is a detail, perspective view of a vehicle frame constructed in accord with the invention.

As apparent in FIGS. 3 and 4, the frame 14 also includes three lateral portions, a forward portion 36, a central portion 38 and a rear portion 40. These frame portions are each formed of metal plate similar to plate 26 and extend perpendicular to the length of the plate 26 and define lateral frame portions wherein the frame is of a width substantially corresponding to the width of the vehicle body 10. The portions 36, 38 and 40 are affixed to the plate 26 by welding, or other fasteners such as bolts or the like. The front portion 36 includes a front edge 42 which extends slightly ahead of the front edge 28 of plate 26, and the ends of plate 36 are beveled as at 44 wherein the plate end regions 46 may function as a running board which aids in access to the cab 12.

A pair of rear axle cradles 48 are mounted upon the upper surface of the plate 26, and a pair of front wheel axle cradles 50 are mounted at the forward region of the plate 26 for receiving the wheel axles 18.

The location of the central frame portion 38 and the rear plate portion 40 is such that the end regions of these portions serve to support the vehicle fenders 20, and as will be appreciated from FIGS. 1 and 2, the vehicle construction is such that the edges of the frame plates 26, 36, 38 and 40 may be visible, and contribute to the heavy duty and sturdy appearance of the vehicle. The front edge 42 of frame portion 36 extends to the front edge of the cab 12 and serves as a bumper protecting the vehicle body, and likewise, the rear edge 52 of the portion 40 serves as a rear bumper. By making the frame serve as a bumper, damage to the vehicle body is reduced in the event of vehicle impact.

Figure 5:
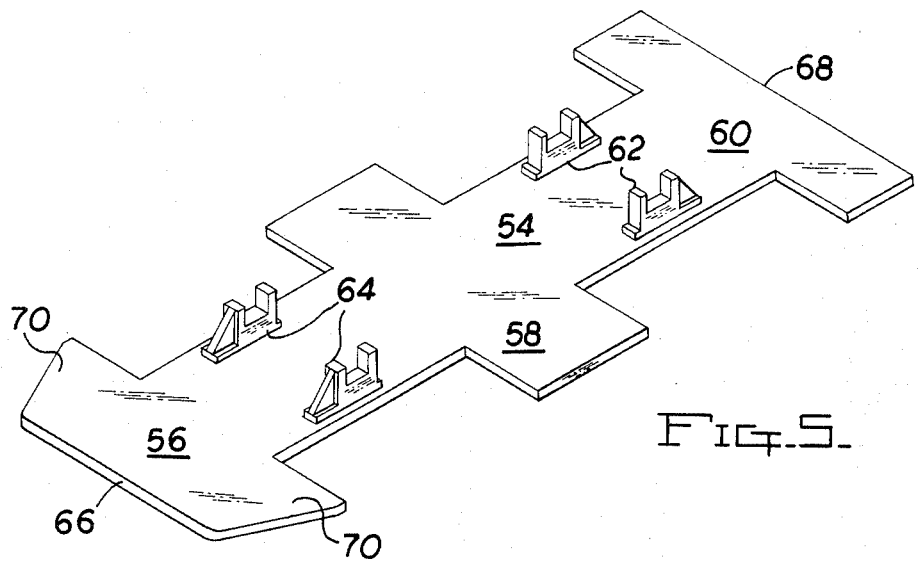
FIG. 5 is a detail, perspective view of another embodiment of a frame constructed in accord with the invention.

In FIG. 5, a homogeneous variation of frame configuration is illustrated. In this embodiment, the frame plate 54 includes a front lateral extending portion 56, a central lateral extending portion 58 and a rear lateral extending portion 60. These lateral extending portions are shaped in a manner similar to that of the embodiment of FIGS. 1-4 and function in a similar manner. Axle cradles 62 and 64 permit the wheel axles to be mounted upon the frame, and as in the previously described embodiment, the front edge 66 may function as a front bumper, while the rear edge 68 forms a rear bumper, and the end regions 70 will serve as a running board for cab access. As with the previously described frame embodiment, the frame plate horizontal thickness is such as to produce the desired weight.

The thickness of the frame plates, or plate, will depend upon the size of the vehicle and the proportion of the net vehicle weight to be provided by the frame. In most vehicle constructions, the weight of the frame will be approximately one half the net weight of the vehicle, and the use of a frame in accord with the invention eliminates the need for counterweights or custom designed ballast weights, as is often used with high traction vehicles. In accord with the invention, the frame will constitute from 40–60% of the vehicle net weight and by evenly distributing the vehicle weight over the vehicle, uniform weight application to the wheels is possible without compromising the design or appearance of the vehicle.

It is appreciated that various modifications to the inventive concepts may be apparent to those skilled in the art without departing from the spirit and scope of the invention.

I claim:

1. In a high traction vehicle having a body having a length and width, a frame, axle supported motor driven wheels mounted upon the frame and a body mounted upon the frame, the improvement comprising said frame extending below the body and comprising a main heavy metal flat plate having a thickness of at least one inch and a length substantially defining the length of the vehicle and lateral portions substantially defining the width of the vehicle.

2. In a high traction vehicle as in claim 1, said lateral portions being homogeneously defined upon said plate.

3. In a high traction vehicle as in claim 1, a plurality of secondary heavy metal plates affixed to said main plate each having a length transversely disposed to the length of said main plate, said secondary plates defining said lateral portions.

4. In a high traction vehicle as in claim 1, wheel axle mounting means defined upon said main frame for mounting the vehicle axles and wheels.

5. In a high traction vehicle as in claim 4, said main frame having an upper surface and a lower surface, said wheel axle mounting means being defined upon said upper surface.

6. In a high traction vehicle as in claim 1, said lateral portions include front portions, central portions and rear portions, said front portions defining a running board and said central and rear portions defining vehicle body supports.

7. In a high traction vehicle as in claim 1, said lateral portions including a front portion having a front edge, said front edge defining a front bumper for the vehicle body.

8. In a high traction vehicle as in claim 1, said frame comprising substantially one-half of the total weight of the vehicle.

* * * * *